(12) United States Patent
Andoh et al.

(10) Patent No.: US 12,055,711 B2
(45) Date of Patent: Aug. 6, 2024

(54) VIRTUAL IMAGE DISPLAY DEVICE

(71) Applicant: DENSO CORPORATION, Kariya (JP)

(72) Inventors: Hiroshi Andoh, Kariya (JP); Kazuhisa Onda, Kariya (JP); Yujiro Mizobuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 400 days.

(21) Appl. No.: 17/524,058

(22) Filed: Nov. 11, 2021

(65) Prior Publication Data

US 2022/0066210 A1 Mar. 3, 2022

Related U.S. Application Data

(63) Continuation of application No. PCT/JP2020/009557, filed on Mar. 6, 2020.

(30) Foreign Application Priority Data

Jul. 4, 2019 (JP) ................................. 2019-125385

(51) Int. Cl.
| | |
|---|---|
| G02B 27/01 | (2006.01) |
| G02B 27/09 | (2006.01) |
| G02B 27/42 | (2006.01) |
| H04N 9/31 | (2006.01) |

(52) U.S. Cl.
CPC ..... *G02B 27/0101* (2013.01); *G02B 27/0944* (2013.01); *G02B 27/0977* (2013.01); *G02B 27/4205* (2013.01); *H04N 9/3152* (2013.01)

(58) Field of Classification Search
CPC ............ G02B 27/0101; G02B 27/0944; G02B 27/0977; G02B 27/4205; H04N 9/3152

USPC .......................................................... 359/630
See application file for complete search history.

(56) References Cited

U.S. PATENT DOCUMENTS

| | | | |
|---|---|---|---|
| 5,035,473 A * | 7/1991 | Kuwayama | ........ G02B 27/0103 359/13 |
| 5,210,626 A | 5/1993 | Kumayama et al. | |
| 2017/0059863 A1 | 3/2017 | Kasazumi et al. | |
| 2017/0090193 A1 | 3/2017 | Harada | |
| 2017/0212346 A1 | 7/2017 | Kawana et al. | |
| 2018/0231774 A1 | 8/2018 | Kawana | |
| 2018/0252916 A1 | 9/2018 | Nakamura et al. | |

FOREIGN PATENT DOCUMENTS

| | | |
|---|---|---|
| JP | H05-341226 A | 12/1993 |
| JP | H06-167671 A | 6/1994 |
| JP | H08-258589 A | 10/1996 |

\* cited by examiner

*Primary Examiner* — Wyatt A Stoffa
*Assistant Examiner* — Mitchell T Oestreich
(74) *Attorney, Agent, or Firm* — Posz Law Group, PLC

(57) ABSTRACT

A virtual image display device displays a virtual image by projecting a display light of an image toward a projection unit, and includes: a display unit configured to emit the display light; and a diffraction reflection element configured to reflect the display light emitted from the display unit by diffraction. The diffraction reflection element has a plate shape along a horizontal plane. The diffraction reflection element is configured to emit the display light toward the projection unit arranged above the diffraction reflection element when the display light is incident, and is set such that an angle of incidence on the diffraction reflection element is larger than an angle of emission from the diffraction reflection element.

10 Claims, 5 Drawing Sheets

VIRTUAL IMAGE DISPLAY DEVICE

CROSS REFERENCE TO RELATED APPLICATION

The present application is a continuation application of International Patent Application No. PCT/JP2020/009557 filed on Mar. 6, 2020, which designated the U.S. and claims the benefit of priority from Japanese Patent Application No. 2019-125385 filed on Jul. 4, 2019. The entire disclosures of all of the above applications are incorporated herein by reference.

TECHNICAL FIELD

The present disclosure relates to a virtual image display device for a vehicle.

BACKGROUND

A virtual image display device includes at least three reflection elements to deflect an optical path of display light ejected from a display unit. Further, the arrangement position and arrangement angle of the three reflection elements are set to satisfy various conditions.

SUMMARY

According to an aspect of the present disclosure, a virtual image display device for a vehicle so as to display a virtual image by projecting a display light of an image toward a projection unit includes: a display unit configured to emit the display light; and a diffraction reflection element configured to reflect the display light emitted from the display unit by diffraction. The diffraction reflection element has a plate shape along a horizontal plane of the vehicle. The diffraction reflection element is configured to emit the display light toward the projection unit positioned above the diffraction reflection element when the display light is incident. An angle of incidence on the diffraction reflection element is larger than an angle of emission from the diffraction reflection element.

DESCRIPTION OF EMBODIMENTS

Figure 1:
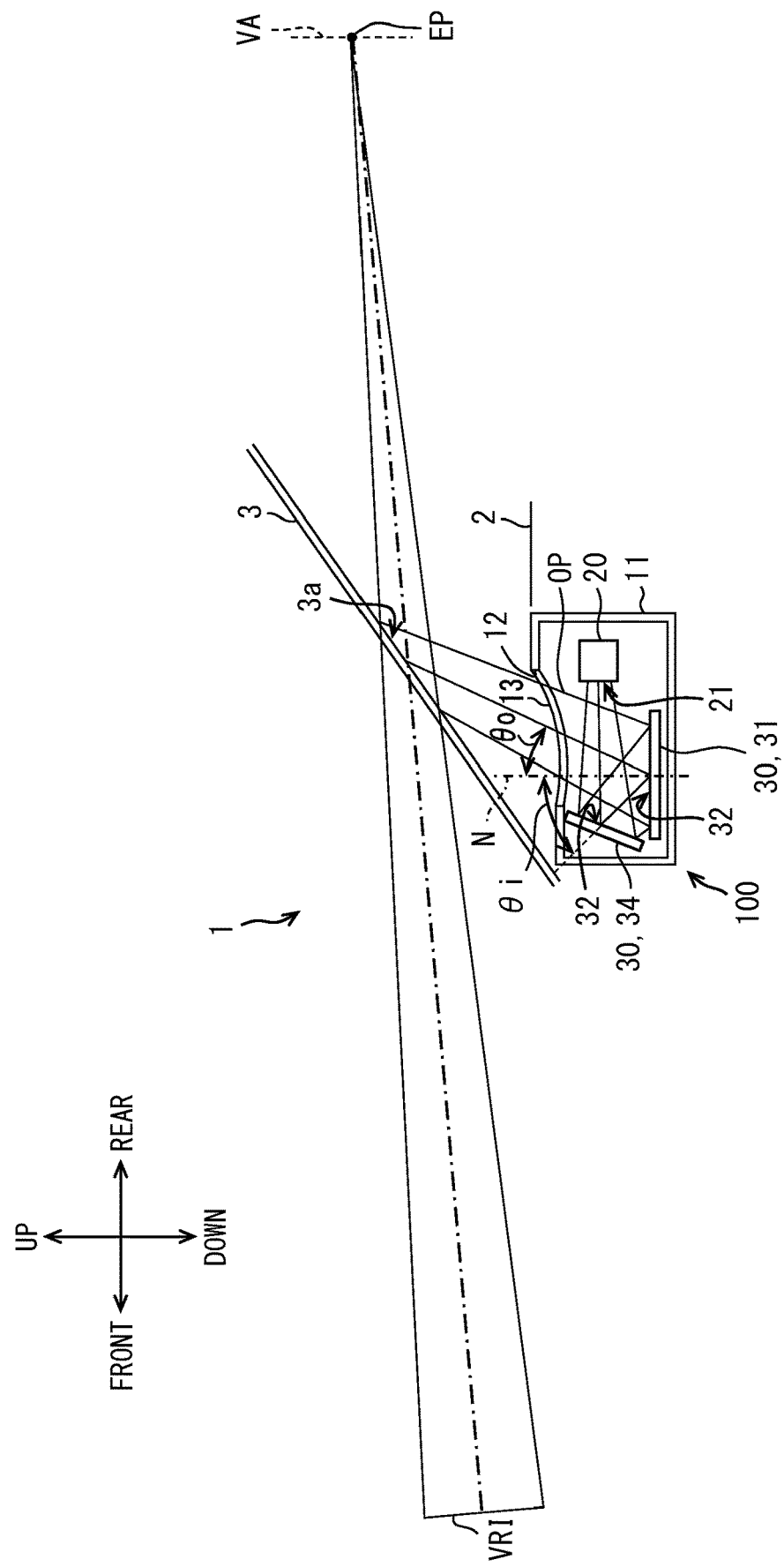
FIG. 1 is a schematic view showing an HUD device according to a first embodiment mounted on a vehicle.

To begin with, examples of relevant techniques will be described.

A virtual image display device includes at least three reflection elements to deflect an optical path of display light ejected from a display unit. Further, the arrangement position and arrangement angle of the three reflection elements are set to satisfy various conditions.

A virtual image display device mounted in a limited space of a vehicle is desired to be miniaturized. On the other hand, it is desired to increase the size of the virtual image displayed by the virtual image display device. In order to increase the size of the virtual image, it is difficult to reduce the horizontal dimension of the virtual image display device along the horizontal plane, since the reflection element emits the display light toward a projection unit arranged above the virtual image display device. Therefore, in order to reduce the size, it is conceivable to reduce the dimension in the height direction perpendicular to the horizontal plane.

In this respect, the display light is specularly reflected by the reflection element (the reflection element immediately before the projection unit) that emits the display light toward the projection unit. In this configuration, the angle of incidence on the reflection element immediately before the projection unit is equal to the angle of emission from the reflection element. Therefore, if the emission direction toward the projection unit is set as upward, the dimension in the height direction increases in the overlapping area of the incident optical path of the display light and the emission optical path of the display light. In order to secure the overlapping area, the physique of the virtual image display device was large.

The present disclosure provides a virtual image display device whose size is suppressed from increasing.

According to an aspect of the present disclosure, a virtual image display device for a vehicle so as to display a virtual image by projecting a display light of an image toward a projection unit includes: a display unit configured to emit the display light; and a diffraction reflection element configured to reflect the display light emitted from the display unit by diffraction. The diffraction reflection element has a plate shape along a horizontal plane of the vehicle. The diffraction reflection element is configured to emit the display light toward the projection unit arranged above the diffraction reflection element when the display light is incident. An angle of incidence on the diffraction reflection element is larger than an angle of emission from the diffraction reflection element.

Accordingly, the diffraction reflection element emits the display light coming from the display unit toward the projection unit arranged above the diffraction reflection element. The diffraction reflection element is formed in a plate shape with a posture along the horizontal plane of the vehicle, and realizes diffraction reflection in which the incident angle is larger than the emission angle. This posture of the diffraction reflection element suppresses increase in the dimension in the height direction in the space occupied by the diffraction reflection element. Then, the dimension in the height direction is reduced in the overlapping region of the incident optical path of the display light and the emission optical path of the display light, since the incident angle is set larger than the emission angle corresponding to the traveling direction from the diffraction reflection element toward the projection unit. Therefore, the increase in the dimension in the height direction is also suppressed in the space where the optical path is formed above the diffraction reflection element. As described above, it is possible to suppress increase in the physique of the device.

Hereinafter, embodiments will be described with reference to the drawings. It should be noted that the same reference numerals are assigned to the corresponding components respectively in the respective embodiments, so that duplicative descriptions may be omitted. When only a part of the configuration is described in the respective embodiments, the configuration of the other embodiments described before may be applied to other parts of the configuration. Further, it is possible to not only combine configurations as specified in the description of the embodiments but also partially combine configurations of embodiments even though not specified herein as long as the combination does not cause difficulty.

First Embodiment

As shown in FIG. 1, a virtual image display device according to a first embodiment is mounted on a automotive as a vehicle 1. The virtual image display device housed in an instrument panel 2 of the vehicle 1 is a head-up display device (hereinafter referred to as an HUD device) 100. Herein, the wording of "vehicle" is broadly construed to include various vehicles such as an aircraft, a ship, and a game console body, which does not move, in addition to an automotive and a railway vehicle.

The HUD device 100 projects the display light of the image emitted from the display unit 20 toward the projection unit 3a provided on the windshield 3 of the vehicle 1. In this way, the HUD device 100 displays a virtual image so that the image is visible by an occupant (such as driver) as a viewer of the vehicle 1. In other words, the display light of the image reflected on the projection unit 3a reaches a visible region VA defined in the cabin of the vehicle 1. An occupant whose eye point EP is located in the visible region VA perceives the display light as a virtual image VRI. The occupant is enabled to recognize various types of information displayed as the virtual image VRI. The various types of information, which is displayed as the virtual image VRI, may be exemplified by information that represents a state of the vehicle 1 such as a vehicle speed and/or a remaining fuel. The information may be further exemplified by visibility assisting information and/or road information.

In the following description, unless otherwise noted, the directions indicated by the front, rear, up, down, left, and right are denoted with respect to the vehicle 1 on the horizontal plane.

The windshield 3 of the vehicle 1 is a transparent member formed in a translucent plate shape and made of, for example, glass or synthetic resin. The windshield 3 is arranged above the instrument panel 2. The windshield 3 is inclined such that the closer to the rear relative to the front, the more the windshield 3 is distant upward from the instrument panel 2. The windshield 3 has the projection unit 3a on which the display light is projected. The projection unit 3a is in a smooth concave shape or in a planar shape. The projection unit 3a may not be provided on the windshield 3. For example, a combiner that is separate from the vehicle 1 may be installed in the cabin of the vehicle 1, and the combiner may be provided with the projection unit 3a.

The visible region VA is a spatial region where the virtual image VRI is visually recognizable such that the virtual image VRI displayed by the HUD device 100 satisfies a predetermined standard (for example, the entirety of the virtual image VRI has a predetermined luminance or higher). The visible region VA is also referred to as an eye box. The visible region VA is typically set to overlap the eyelips of the vehicle 1. The eyelips is set for each of the eyes, and is set as an ellipsoidal virtual space based on the eye range that statistically represents the spatial distribution of the eye point EP of the occupant.

A specific configuration of the HUD device 100 will be described below. The HUD device 100 includes a housing 11, a display unit 20, a specular reflection mirror 34, and a diffraction reflection element 31.

The housing 11 has a light-shielding wall made of, for example, synthetic resin or metal. An internal space of the housing 11 surrounded by the wall is shaped in a hollow box. The housing 11 houses and holds the display unit 20, a control circuit board that controls the display unit 20, the specular reflection mirror 34, the diffraction reflection element 31, and the like in the internal space. An upper part of the housing 11 that faces the projection unit 3a in the vertical direction has a window portion 12. The window portion 12 is optically opened for transmitting the light of image.

The window portion 12 may be physically opened, or may be closed by a dustproof cover 13 formed in a transparent thin plate shape. The window portion 12 of the present embodiment is covered with the dustproof cover 13 that is curved so as to be convex toward the internal space of the housing 11.

The display unit 20 displays a real image or a virtual image on the screen 21. The image is to be formed as the virtual image VRI. The display unit 20 may employ various types of displays, such as a liquid crystal display, a micro LED display that constitutes the screen 21 by arranging micro LEDs, a laser scanner display, or a digital light processing display (DLP display (registered trademark)). The liquid crystal display displays an image by using a transmissive or reflective liquid crystal panel. The DLP display uses a digital micromirror device (DMD).

The display unit 20 of the present embodiment emits display light toward the specular reflection mirror 34 from the screen 21 displaying a color image. Red light, green light, and blue light are combined in the display light. The display unit 20 may emit a white light, which includes lights having wavelengths in a visible range, as the display light.

The specular reflection mirror 34 and the diffraction reflection element 31 form a light guide unit 30 that forms an optical path OP to guide the display light from the display unit 20 toward the projection unit 3a arranged above the HUD device 100. By forming the optical path OP, it is possible to increase the display distance from the visible region VA to the virtual image VRI.

The specular reflection mirror 34 is a reflection element that specularly reflects the display light. The specular reflection mirror 34 is arranged between the display unit 20 and the diffraction reflection element 31 in the optical path OP. The specular reflection mirror 34 forms a reflection surface 35 by depositing aluminum on the surface of a base material made of, for example, synthetic resin or glass. The reflection surface 35 is formed in a smooth planar shape. The display light incident on the specular reflection mirror 34 from the display unit 20 is reflected by the reflection surface 35 toward the diffraction reflection element 31.

The diffraction reflection element 31 is arranged between the specular reflection mirror 34 and the projection unit 3a in the optical path OP. The diffraction reflection element 31 has a diffraction structure that reflects the display light by diffraction. For example, the diffraction reflection element 31 has a periodic refractive index distribution in the medium. In detail, the diffraction reflection element 31 is a holographic optical element formed in a thin plate shape, in which a hologram layer is interposed between substrate layers. The periodic refractive index distribution in the hologram layer forms the diffraction structure. It could be preferable to adopt, as the holographic element, a volumetric-type holographic element in consideration of its diffraction efficiency and its wavelength dependency.

The pair of substrate layers are formed in a thin plate shape with, for example, synthetic resin or glass to protect and reinforce the hologram layer. Of the pair of substrate layers, the substrate layer adjacent to a surface 32 of the diffraction reflection element 31 on which the display light is incident is formed as translucent. The other substrate layer may be formed as translucent or dark (for example, black). Further, the other substrate layer may not be provided, and the hologram layer may be exposed to the back side.

The hologram layer is formed in advance in a state where information of an amplitude and a phase of an object light is recorded as interference fringes with respect to a reference light in a hologram material. The interference fringes are caused by the above-described periodic refractive index distribution. The hologram material may be a material mainly composed of a synthetic resin, a gelatin photosensitive material, or a silver salt photosensitive material, or the like. The hologram material may be a material enabled to record information of the amplitude and the phase of the object light by using a spatial modulation of the refractive index.

The hologram layer is formed with interference fringes that cause Bragg reflection of the display light. For example, the modulation direction in which the refractive index is modulated in the interference fringes is set in a direction inclined with respect to the surface 32 of the diffraction reflection element 31. As a result, in the first-order diffracted light having the highest diffraction order (hereinafter referred to as the first-order diffracted light), the incident angle $\theta i$ and the emission angle $\theta o$ with respect to the normal N of the surface 32 are different from each other. The reflection of the display light by the diffraction reflection element 31 is asymmetrical reflection in which the incident angle $\theta i$ and the emission angle $\theta o$ are different. The display light incident on the diffraction reflection element 31 from the specular reflection mirror 34 is reflected by the hologram layer toward the projection unit 3a.

The interference fringes of the hologram layer are formed so that the modulation direction changes according to the incident position of the display light. As a result, the optical power of the diffraction reflection element 31 is positive, and the diffraction reflection element 31 has a function of condensing the display light. The light collecting function can increase the size of the virtual image VRI.

The interference fringes of the hologram layer have wavelength dependence. In the present embodiment, for example, the wavelength of green light is a reference wavelength (a wavelength that serves as a reference for design) in the interference fringes. The above-mentioned incident angle $\theta i$ and emission angle $\theta o$ correspond to the reference wavelength. The wavelength of the display light capable of diffracting and reflecting the first-order diffracted light by the interference fringes is not limited to the reference wavelength, but is a wavelength region (visible region) including red light and blue light. Further, the incident angle $\theta i$ and the emission angle $\theta o$ are angles at the center point Ph of a main ray, which will be described later. The main ray means a ray directed from the center point Pd of the screen 21 to the center point Ph of the diffraction reflection element 31.

The display light reflected by the diffraction reflection element 31 is specularly reflected by the projection unit 3a and reaches the visible region VA. Therefore, the occupant whose eye point EP is located in the visible region VA can visually recognize the virtual image VRI in the outdoor space of the vehicle 1 on the side opposite to the visible region VA through the projection unit 3a. Here, the projection unit 3a is displayed so as to superimpose on the outdoor scenery visually recognized through the windshield 3 as a transparent member.

Hereinafter, the optical path OP from the display unit 20 to the projection unit 3a and the light guide unit 30 forming the optical path OP will be described in detail. The surface 32 of the diffraction reflection element 31 is arranged in a posture along the horizontal plane of the vehicle 1 (for example, a posture substantially parallel to the horizontal plane of the vehicle 1). In the present embodiment, the horizontal plane of the vehicle 1 means the zero Z plane (horizontal plane orthogonal to the zero Y plane and the zero X plane) defined in JIS D0030-1982. When the vehicle 1 is on a horizontal ground plane, the horizontal plane of the vehicle 1 is substantially parallel to the ground plane. The "posture along the horizontal plane" shown in the present embodiment includes a posture parallel to the horizontal plane and a posture inclined with an inclination angle within ±10 [deg] with respect to the horizontal plane.

The diffraction reflection element 31 is arranged below the center in the internal space of the housing 11 (for example, on the bottom of the housing 11). The surface 32 of the diffraction reflection element 31 on which the display light is incident is oriented upward. The diffraction reflection element 31 is formed so that the incident angle $\theta i$ of the display light from the specular reflection mirror 34 is larger than the emission angle $\theta o$ toward the projection unit 3a.

More specifically, under the general conditions of the vehicle 1, the incident angle of the display light on the projection unit 3a is set in the range of 55 to 65 [deg] or the range of 60 to 65 [deg]. Then, the position where the diffraction reflection element 31 is arranged is determined. If the surface 32 of the diffraction reflection element 31 is greatly tilted with respect to the horizontal plane, the dimension of the HUD device 100 in the height direction becomes large. Therefore, the surface 32 of the diffraction reflection element 31 is aligned with the horizontal plane. Then, the emission angle $\theta o$ is determined by the relationship between the posture and position of the diffraction reflection element 31 and the position of the projection unit 3a.

Figure 2:
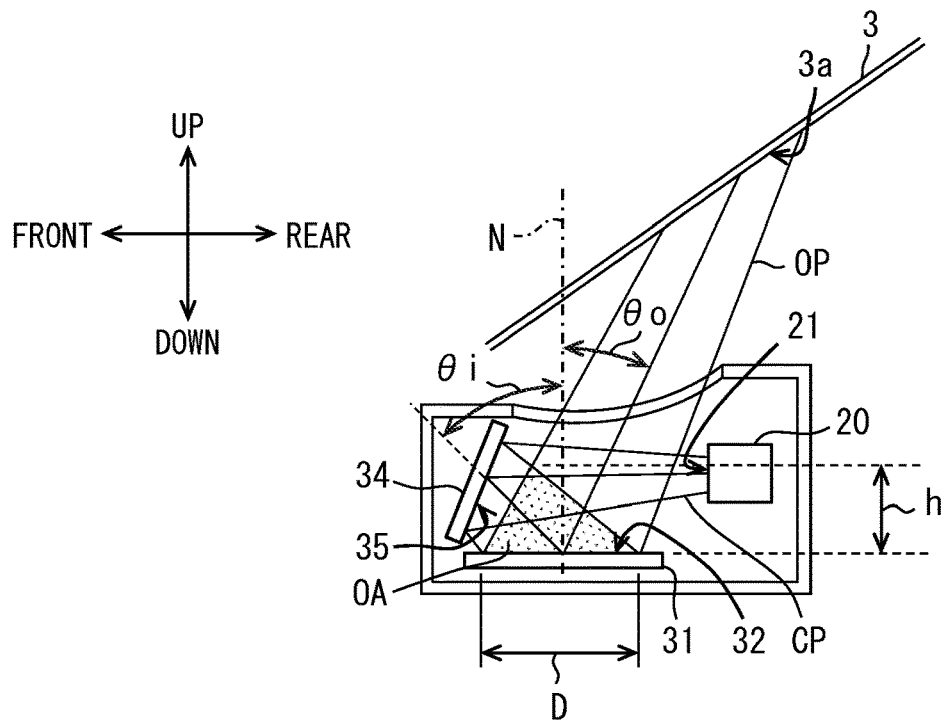
FIG. 2 is a diagram showing optical paths and an overlapping region in the HUD device according to the first embodiment.

The incident angle $\theta i$ is set larger than the emission angle $\theta o$ determined in this way. Accordingly, the dimension of the overlapping region OA in the height direction can be reduced. The incident optical path of the display light incident on the diffraction reflection element 31 and the emission optical path of the display light emitted from the diffraction reflection element 31, which are formed above the diffraction reflection element 31, overlap each other to form a triangular shape in the cross section. For example, when the emission angle $\theta o$ is 30 [deg] and the incident angle $\theta i$ is 45 [deg], the height dimension of the overlapping region OA can be reduced to about 73% of the condition where the incident angle $\theta i$ is 30 [deg]. In FIG. 2 and the like, the overlapping region OA is shown by dot hatching.

As shown in FIG. 2, when the beam width of the display light incident on the diffraction reflection element 31 is defined as D, the dimension h in the height direction of the overlapping region OA can be represented by h≈D/(tan θo+tan θi). Therefore, if the condition of tan θi≥1.5×tangο is satisfied, the dimension h in the height direction can be reduced by at least 20%.

The specular reflection mirror 34 is arranged at a position immediately before the diffraction reflection element 31, on which the incident light is incident, in the optical path OP in order to set the incident angle θi larger than the emission angle θo. The specular reflection mirror 34 is arranged in front of the center in the internal space of the housing 11, and has the reflection surface 35, which specularly reflects the display light, directed in an oblique direction rearward and downward.

The display unit 20 is arranged on the rear side of the center in the internal space of the housing 11 so that the display light is incident on the specular reflection mirror 34. The display unit 20 emits the display light frontward. The display unit 20 and the specular reflection mirror 34 are arranged in the front-rear direction at a position above the surface 32 of the diffraction reflection element 31. As a result, the display light emitted from the display unit 20 travels on the intersecting optical path CP extended parallel to the surface 32 and is incident on the specular reflection mirror 34. The intersecting optical path CP intersects the overlapping region OA and further overlaps with the overlapping region OA.

Further, in the present embodiment, the following mathematical formula MF1 is established.

$$Db/2 \cdot \cos\theta o < (L1+L2) \cdot \sin(\theta i - \theta o) - Sv/2 \cdot \cos(\theta i - \theta o) \quad \text{(MF1)}$$

Figure 3:
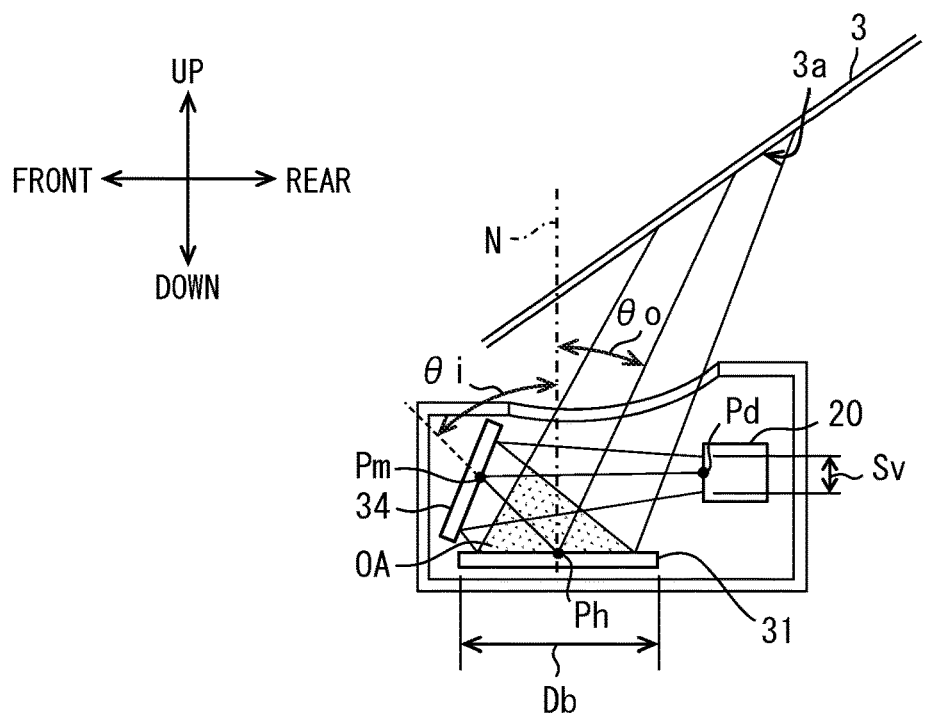
FIG. 3 is a diagram showing an effective size of a screen in the first embodiment.

As shown in FIG. 3, Db is the size of the diffraction reflection element 31 (specifically, the width of the diffraction reflection element 31 in the plane direction on which the display light is incident). In the present embodiment, since the plane direction is along the front-rear direction, Db is the width of the diffraction reflection element 31 in the front-rear direction. L1 is the distance between the screen 21 of the display unit 20 and the specular reflection mirror 34. More precisely, L1 is the distance between the point Pd and the point Pm. L2 is the distance between the specular reflection mirror 34 and the diffraction reflection element 31. More precisely, L2 is the distance between the point Pm and the point Ph. The point Pd is the center point of the screen 21 of the display unit 20. The point Pm is the center point of the specular reflection mirror 34. The point Ph is the center point of the diffraction reflection element 31. Sv is the size of the screen 21 of the display unit 20 (specifically, the width of the display unit 20 in a direction corresponding to the incident surface of the diffraction reflection element 31 on which the display light is incident). Sv is the effective size particularly effective for displaying the virtual image VRI. In the present embodiment, in the display unit 20, since the direction corresponding to the incident surface of the diffraction reflection element 31 is along the up-down direction, Sv is the size of the screen 21 of the display unit 20 in the up-down direction.

Figure 4:
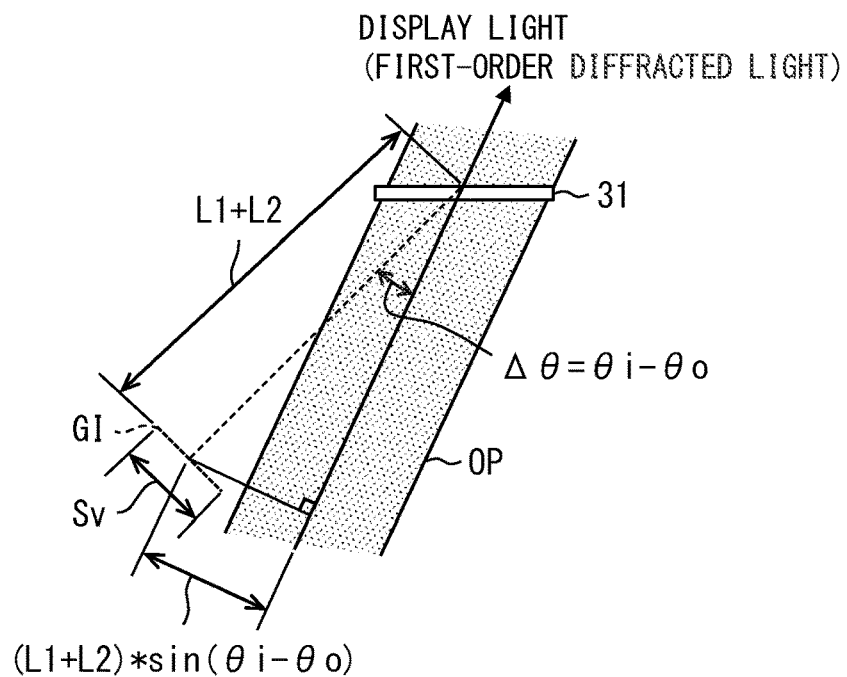
FIG. 4 is a diagram in which a part of the optical path of the first embodiment is schematically developed in a straight line, to show a positional relationship between an optical path of a first-order diffracted light and a surface-reflected virtual image.

In the present embodiment, a part of the display light may be specularly reflected on the surface 32 of the diffraction reflection element 31. Mathematical Formula MF1 means, as shown in FIG. 4, the position of the surface-reflected virtual image (ghost image) GI due to the surface reflection is outside of the optical path OP of the display light by the first-order diffracted light (the range of the dot hatching in FIG. 4 is the width of the optical path OP).

More specifically, Db/2• cos θo in Mathematical Formula MF1 is a component perpendicular to the optical path OP, which is half the size of the diffraction reflection element 31. θi−θo in Mathematical Formula MF1 is an offset angle of the surface-reflected light with respect to the first-order diffracted light. (L1+L2)• sin (θi−θo) in Mathematical Formula MF1 is the distance between the center point of the surface-reflected virtual image GI and the center of the optical path OP of the normal virtual image VRI due to the first-order diffracted light. Sv/2• cos(θi−θo) in Mathematical Formula MF1 is a component perpendicular to the optical path OP, which is half the size of the surface-reflected virtual image GI. Therefore, Mathematical Formula MF1 means that the component perpendicular to the optical path OP, which is half the size of the diffraction reflection element 31, is smaller than the value obtained by subtracting the component perpendicular to the optical path OP, which is half the size of the surface-reflected virtual image GI from the distance between the center point of the surface-reflected virtual image GI and the central axis of the optical path OP of the normal virtual image VRI by the first-order diffracted light. The central axis of the optical path OP substantially coincides with the main ray.

Since the surface-reflected virtual image GI is located outside the optical path OP, it is possible to restrict the occupant from visually recognizing the normal virtual image VRI and the surface-reflected virtual image GI at the same time.

In the first embodiment, the diffraction reflection element 31 corresponds to a horizontal diffraction reflection element formed in a plate shape along the horizontal plane of the vehicle to emit the incident display light toward the projection unit 3a arranged above the horizontal diffraction reflection element. The specular reflection mirror 34 corresponds to an incident-angle definition reflection element that defines the incident angle θi of the display light on the diffraction reflection element 31.

Operations and effects in the first embodiment will be described below.

According to the first embodiment, the diffraction reflection element 31 emits the display light from the display unit 20 toward the projection unit 3a arranged above the diffraction reflective element 31 shaped in a plate having a posture along the horizontal plane of the vehicle 1. The diffraction reflection element 31 realizes a diffraction reflection in which the incident angle θi is larger than the emission angle θo. This posture of the diffraction reflection element 31 suppresses increase in the dimension in the height direction in the space occupied by the diffraction reflection element 31. Then, the dimension in the height direction can be reduced in the overlapping region OA by setting the incident angle θi larger than the emission angle θo corresponding to the direction from the diffraction reflection element 31 toward the projection unit 3a. Therefore, in the space where the optical path OP is formed above the diffraction reflection element 31, the dimension in the height direction can be also suppressed from increasing. As described above, it is possible to suppress the increase in the physique of the device 100.

Further, according to the first embodiment, the specular reflection mirror 34 is arranged immediately before the diffraction reflection element 31 in the optical path OP between the display unit 20 and the diffraction reflection element 31. The specular reflection mirror 34 specularly reflects the display light, and defines the incident angle θi to be larger than the emission angle θo. Due to the arrangement immediately before the specular reflection mirror 34, the display light is reflected in the space adjacent to the incident side of the display light with respect to the diffraction reflection element 31. Therefore, if a small space for arranging the specular reflection mirror 34 is set on the incident side, the optical path OP can be formed. In this way, the device 100 can be easily mounted in the vehicle 1.

Further, since the specular reflection mirror 34 specularly reflects the display light, the specular reflection mirror 34 is unlikely to generate a double image of the surface-reflected light and the diffracted reflection light. Therefore, even if the specular reflection mirror 34 is brought close to the diffraction reflection element 31, it is not necessary to take measures against multiple reflections of unnecessary light among the surface-reflected light and the diffracted reflection light with respect to the diffraction reflection element 31. Thus, it is possible to easily achieve both the suppression of the physique of the device 100 and the high visibility of the virtual image VRI.

Further, according to the first embodiment, the above-mentioned Mathematical Formula MF1 is established. Therefore, it is suppressed that the occupant simultaneously recognizes both the virtual image VRI by the display light diffracted and reflected by the diffraction reflection element 31 and the surface-reflected virtual image GI by the display light surface-reflected by the surface 32 of the diffraction reflection element 31. In this way, the visibility of the virtual image VRI can be improved.

Further, according to the first embodiment, the display unit 20 is arranged so as to form the intersecting optical path CP. The intersecting optical path CP extends parallel to the surface 32 above the surface 32 of the diffraction reflection element 31 and intersects the overlapping region OA of the incident optical path and the emission optical path. The incident optical path, the emission optical path, and the intersecting optical path CP triply overlap above the surface 32 of the diffraction reflection element 31. Therefore, it is possible to increase the display distance of the virtual image VRI while suppressing increase in the physique of the device 100.

Second Embodiment

Figure 5:
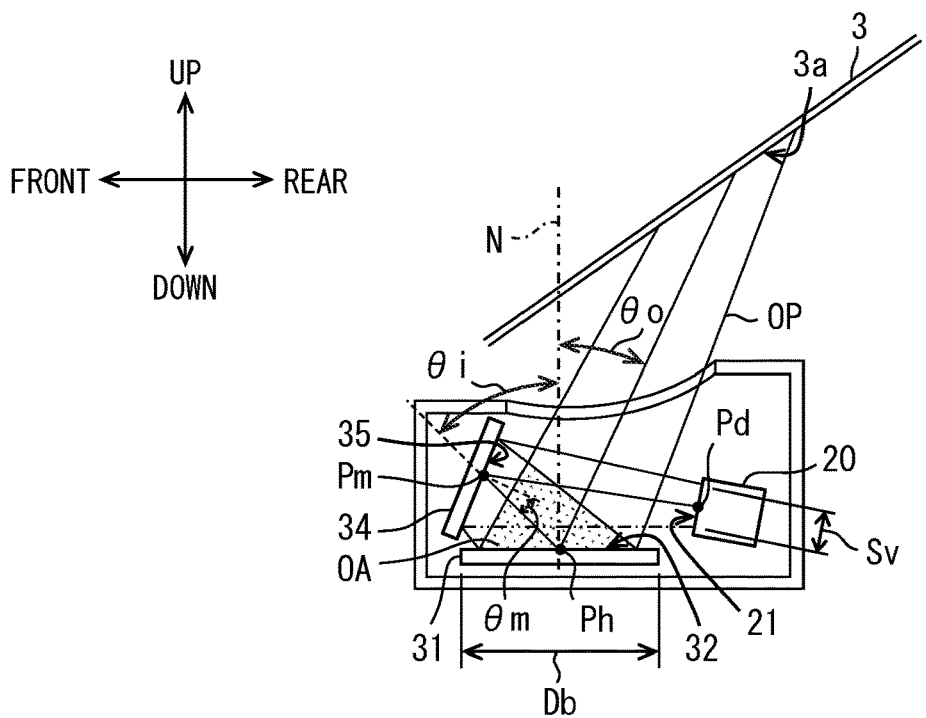
FIG. 5 is a diagram showing optical paths according to a second embodiment.

As shown in FIG. 5, a second embodiment is a modification of the first embodiment. The second embodiment will be described focusing on matters different from the first embodiment.

In the second embodiment, the following mathematical formula MF2 is established.

$$(Db \cdot \cos\theta i - Sv)/(2 \cdot (L1+L2) - Db \cdot \sin\theta i) > \tan(\pi/2 - (\theta i + 2 \cdot \theta m)) \quad \text{[MF2]}$$

θm is a reflection angle of the display light in the specular reflection mirror 34. Mathematical Formula MF2 means that interference is avoided between the ray of display light (double chain line in FIG. 5) emitted from the lower end point of the screen 21 of the display unit 20 toward the specular reflection mirror 34 and the diffraction reflection element 31.

Details will be described below. δ is the angle difference between the ray travelling from the point Pd toward the point Ph after reflected at the point Pm and the ray travelling from the lower end point of the screen 21 toward the front end of the diffraction reflection element 31 after reflected by the specular reflection mirror 34. Then, tan δ is expressed by the following mathematical formula MF3.

$$\tan\delta = (Db \cdot \cos\theta i - Sv)/(2 \cdot (L1+L2) - Db \cdot \sin\theta i) \quad \text{[MF3]}$$

Further, the ray travelling from the lower end point of the screen 21 toward the specular reflection mirror 34 is parallel to the surface 32 of the diffraction reflection element 31 at the condition of $\delta + 2 \cdot \theta m + \theta i = \pi/2$. Therefore, the above-mentioned interference can be avoided by satisfying the condition of $\delta + 2 \cdot \theta m + \theta i > \pi/2$, at which the ray can be set to a straight line reaching parallel.

According to the second embodiment, when Mathematical Formula MF2 is satisfied, the interference between the ray emitted from the lower end point of the screen 21 of the display unit 20 toward the specular reflection mirror 34 and the diffraction reflection element 31 is avoided. Therefore, the visibility of the virtual image VRI can be improved while suppressing increase in the physique of the device 100.

Third Embodiment

Figure 6:
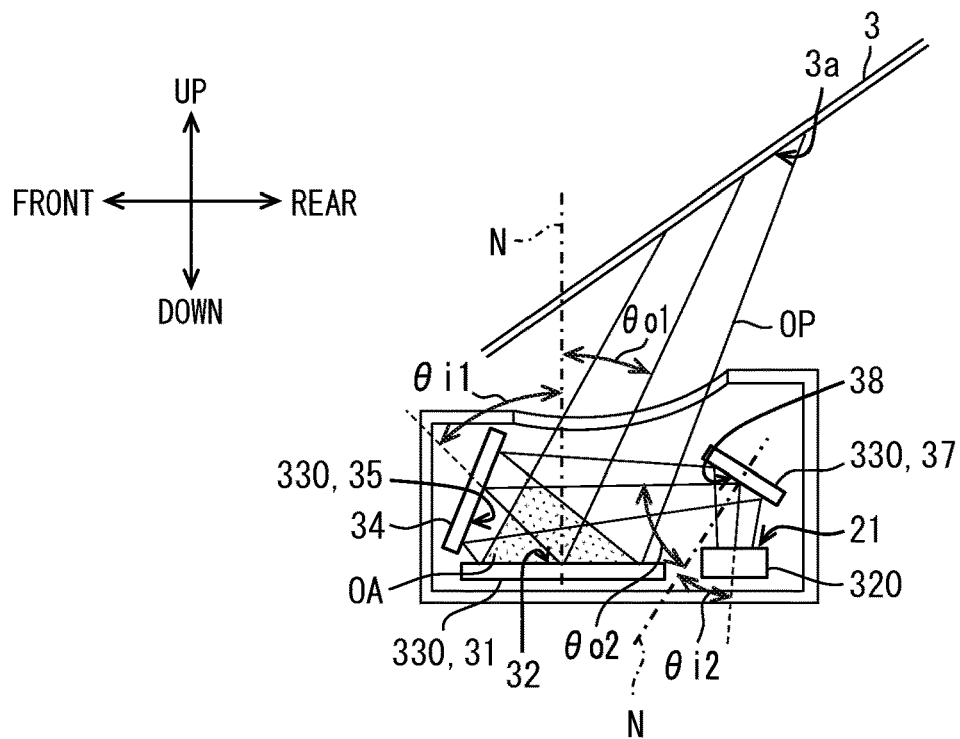
FIG. 6 is a diagram showing optical paths according to a third embodiment.
Figure 7:
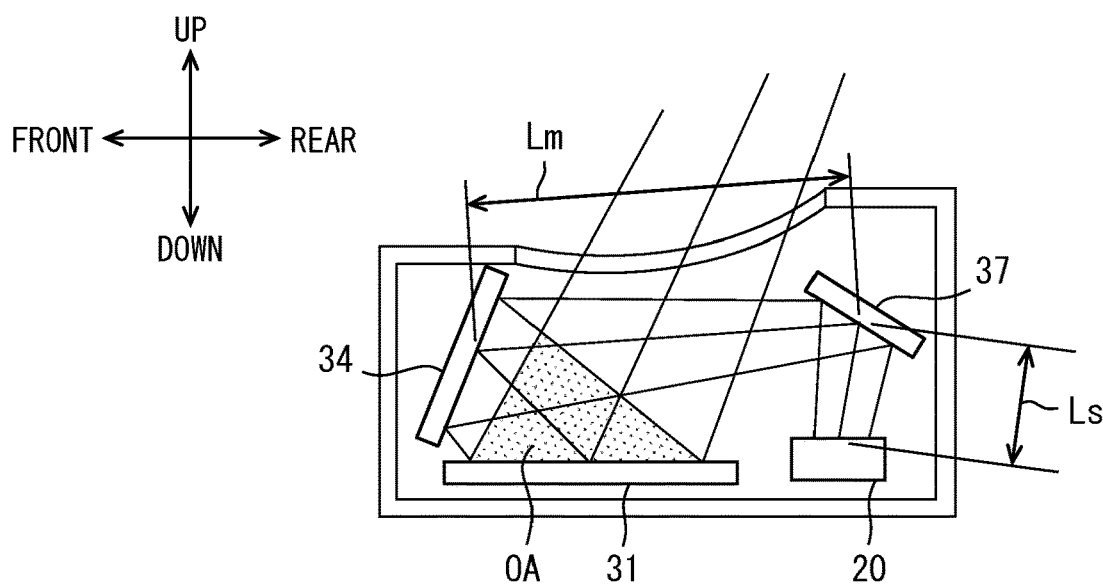
FIG. 7 is a diagram showing a positional relationship between a display unit, an additional diffraction reflection element, and a specular reflection mirror of the third embodiment.
Figure 8:
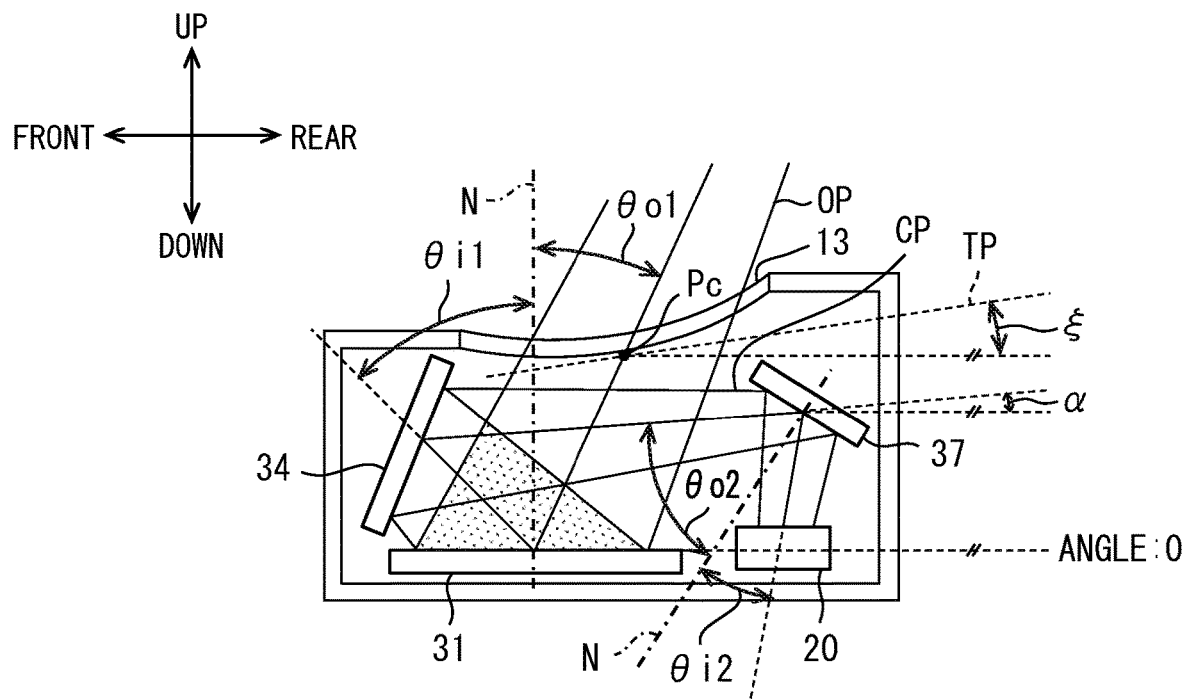
FIG. 8 is a diagram for explaining an angle of an intersecting optical path in the third embodiment.

As shown in FIGS. 6 to 8, a third embodiment is a modification to the first embodiment. The third embodiment will be described focusing on configurations different from the first embodiment.

As shown in FIG. 6, the light guide unit 330 of the third embodiment includes an additional diffraction reflection element 37 in addition to the specular reflection mirror 34 and the diffraction reflection element 31. The diffraction reflection element 37 is arranged between the display unit 320 and the diffraction reflection element 31 on the optical path OP. More specifically, the diffraction reflection element 37 is arranged between the display unit 20 and the specular reflection mirror 34. Similar to the diffraction reflection element 31, the diffraction reflection element 37 has a diffraction structure (for example, a structure of interference fringes of a hologram layer) that reflects incident display light by diffraction. In the present embodiment, the optical power of the diffraction reflection element 37 is substantially zero.

The arrangement of the display unit 320 is different from that of the first embodiment in accordance with the addition of the diffraction reflection element 37. Specifically, the display unit 320 is arranged behind and below the center in the internal space of the housing 11 (for example, behind the diffraction reflection element 31 at the bottom of the housing 11) so as to emit display light upward. The diffraction reflection element 37 is arranged behind the center in the internal space of the housing 11 (for example, at a position behind the specular reflection mirror 34 and above the display unit 20), and has a surface 38 on which the display light is incident. The surface 38 is oriented diagonally forward and downward.

The display light emitted from the display unit 20 is diffracted and reflected by the diffraction reflection element 37, travels on the intersecting optical path CP extended parallel to the surface 32 at a position above the surface 32, and is incident on the specular reflection mirror 34. The intersecting optical path CP intersects the overlapping region OA and further overlaps with the overlapping region OA.

The diffraction reflection element 37 causes a wavelength dispersion in the direction opposite to the wavelength dispersion of the diffraction reflection element 31. Specifically, in the display light at the diffraction reflection element 31, the incident angle θi1 of the reference wavelength is larger than the emission angle θo1. Therefore, in the diffraction reflection element 31, the emission angle of light having a wavelength longer than the reference wavelength is smaller than the emission angle θo of the reference wavelength, and the emission angle of light having a wavelength shorter than the reference wavelength is larger than the emission angle θo of the reference wavelength.

On the other hand, in the diffraction reflection element 37, the incident angle θi2 of the reference wavelength is set smaller than the emission angle θo2. Therefore, in the diffraction reflection element 37, the emission angle of light having a wavelength longer than the reference wavelength is larger than the emission angle θo2 of the reference wavelength, and the emission angle of light having a wavelength shorter than the reference wavelength is smaller than the emission angle θo2 of the reference wavelength. The wavelength dispersion of the entire light guide unit 330 can be suppressed by combining the two diffraction reflection elements 31 and 37.

Further, the absolute value of the angle difference between the incident angle θi2 and the emission angle θo2 in the diffraction reflection element 37 is larger than the absolute value of the angle difference between the incident angle θi1 and the emission angle θo1 in the diffraction reflection element 31. As a result, the starting point at which the wavelength dispersion diverges can be adjusted to a position closer to the display position of the virtual image VRI.

In order to efficiently diffract and reflect the display light at the diffraction reflection element 31, it is preferable that the incident angle θi1 is set smaller than or equal to 60 [deg]. When the emission angle θo1 is set to 30 [deg] with respect to the incident angle θi1 of 60 [deg], the height dimension of the overlapping region OA can be reduced to about 44% compared with the condition that the incident angle θi1 and the emission angle θo1 are 30 [deg].

As shown in FIG. 7, the distance Lm between the diffraction reflection element 37 and the specular reflection mirror 34 is larger than the width of the diffraction reflection element 31 in the front-rear direction. Further, the distance Ls between the display unit 20 and the diffraction reflection element 37 is set ½ or less of the distance Lm between the diffraction reflection element 37 and the specular reflection mirror 34. Thus, the dimension in the height direction of the HUD device 100 can be restricted from increasing while avoiding interference between the display light emitted from the lower end point of the screen 21 of the display unit 20 toward the specular reflection mirror 34 and the diffraction reflection element 31.

As shown in FIG. 8, in the cross section including the up-down direction and the front-rear direction, a represents a rearward angle of the main ray of the display light traveling between the diffraction reflection element 37 and the specular reflection mirror 34 in the optical path OP with respect to the surface 32 of the diffraction reflection element 31. Further, in this cross section, ξ represents a rearward angle formed by the tangent plane TP at the center point Pc of the dustproof cover 13 with respect to the surface 32 of the diffraction reflection element 31. Then, the condition of $0 \leq \alpha \leq \xi$ is satisfied.

By satisfying this condition, it is possible to restrict the display light from interfering with the diffraction reflection element 31 and the dustproof cover 13 when the intersecting optical path CP is set to be located between the diffraction reflection element 31 and the dustproof cover 13. In particular, by setting $\alpha = \xi/2$, the interference suppression effect is maximized.

In the third embodiment, the diffraction reflection element 37 is provided separately from the diffraction reflection element 31, and corresponds to an additional diffraction reflection element that reflects the display light by diffraction.

According to the third embodiment, the diffraction reflection element 37 forming the intersecting optical path CP is provided separately from the diffraction reflection element 31. The intersecting optical path CP extends in a direction parallel to the surface 32 above the surface 32 of the diffraction reflection element 31 and intersects the overlapping region OA of the incident optical path and the emission optical path relative to the diffraction reflection element 31. It is possible to increase the display distance of the virtual image VRI while suppressing increase in the physique of the device 100 by making the incident optical path, the emission optical path, and the intersecting optical path CP to overlap with each other above the surface 32 of the diffraction reflection element 31.

Further, according to the third embodiment, when the condition of $0 \leq \alpha \leq \xi$ is satisfied, the intersecting optical path CP can be located between the dustproof cover 13 and the diffraction reflection element 31 while avoiding interference.

Further, according to the third embodiment, the diffraction reflection element 37 causes wavelength dispersion in the opposite direction to the wavelength dispersion caused by the difference between the incident angle θi1 and the emission angle θo1 of the diffraction reflection element 31. The color shift of the virtual image VRI is suppressed by canceling at least a part of the wavelength dispersion by the two diffraction reflection elements 31 and 37.

In this way, the visibility of the virtual image VRI can be improved.

Further, according to the third embodiment, the absolute value of the angle difference between the incident angle θi2 and the emission angle θo2 is larger than the absolute value of the angle difference between the incident angle θi1 and the emission angle θo1. Thus, it is possible to make it difficult for the occupant to recognize the color shift by making the display light of each color look like the divergent light diverging from the display position of the virtual image VRI.

Other Embodiments

Although the embodiments have been described above, the present disclosure is not construed as being limited to the embodiments, and can be applied to various embodiments and combinations within a scope that does not depart from the gist of the present disclosure.

Specifically, as a first modification, at least one of the diffraction reflection element 31, the diffraction reflection element 37, and the specular reflection mirror 34 is formed in a curved shape having, for example, a smooth curved surface, other than a flat plate shape. As a second modification, the optical power of the diffraction reflection element 31 is substantially 0, and it is not necessary to have the function of enlarging the virtual image VRI.

As a third modification, the optical power of the diffraction reflection element 37 may be set to positive or negative.

As a fourth modification, a lens, a mirror, a prism, a polarizing plate, a retardation plate, an optical filter, or the like may be added on the optical path OP.

Figure 9:
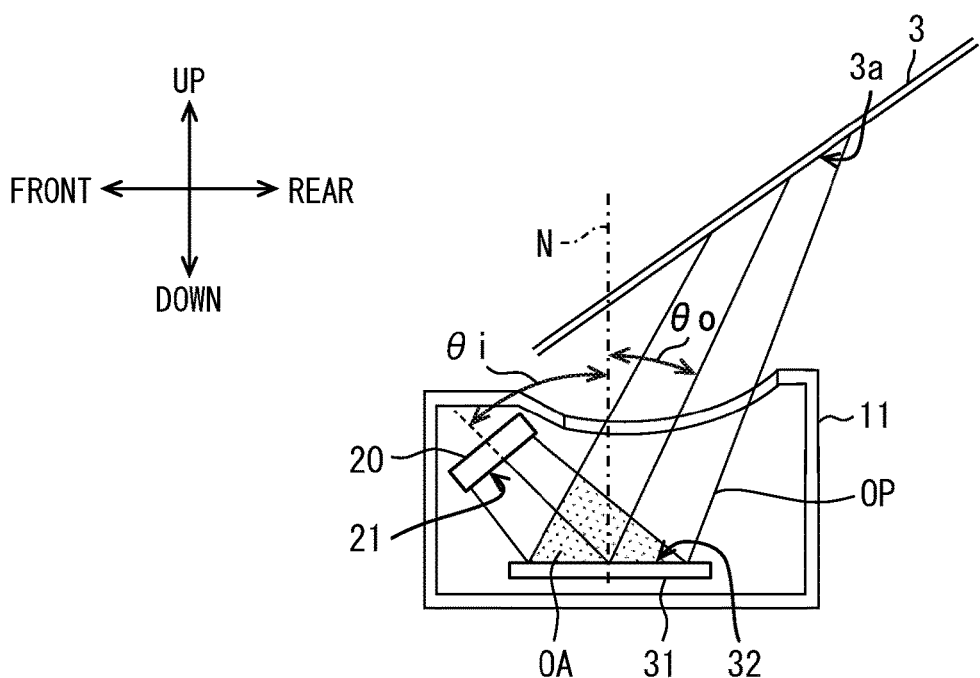
FIG. 9 is a diagram showing optical paths in a fifth modification.

As a fifth modification, as shown in FIG. 9, the light guide unit 30 may be composed of only the diffraction reflection element 31 without providing an optical element such as the specular reflection mirror 34 between the display unit 20 and the diffraction reflection element 31 in the optical path OP.

What is claimed is:

1. A virtual image display device for a vehicle so as to display a virtual image by projecting a display light of an image toward a projection unit, the virtual image display device comprising:

a display unit configured to emit the display light;
a horizontal diffraction reflection element configured to reflect the display light emitted from the display unit by diffraction, the horizontal diffraction reflection element having at least one flat surface along a horizontal plane of the vehicle; and
an incident-angle definition reflection element that defines the angle of incidence on the horizontal diffraction reflection element, wherein
the horizontal diffraction reflection element is configured to emit the display light toward the projection unit arranged above the horizontal diffraction reflection element when the display light is incident,
the angle of incidence on the horizontal diffraction reflection element is larger than an angle of emission from the horizontal diffraction reflection element,
the incident-angle definition reflection element specularly reflects the display light,
the incident-angle definition reflection element is arranged between the display unit and the horizontal diffraction reflection element on an optical path immediately before the horizontal diffraction reflection element, and
the incident-angle definition reflection element defines the angle of incidence on the horizontal diffraction reflection element such that the angle of incidence on the horizontal diffraction reflection element is larger than the angle of emission from the horizontal diffraction reflection element.

2. The virtual image display device according to claim 1, further comprising an additional diffraction reflection element that forms an intersecting optical path extended parallel to a surface of the horizontal diffraction reflection element at an upper side of the surface of the horizontal diffraction reflection element, wherein
the additional diffraction reflection element is provided separately from the horizontal diffraction reflection element,
the additional diffraction reflection element reflects the display light by diffraction,
the additional diffraction reflection element is arranged between the display unit and the incident-angle definition reflection element on the optical path, and
the intersecting optical path intersects an overlapping region where an incident optical path of the display light incident on the horizontal diffraction reflection element and an emission optical path of the display light emitted from the horizontal diffraction reflection element overlap with each other.

3. The virtual image display device according to claim 2, further comprising a translucent dustproof cover that closes a window portion of a housing at an upper side of the horizontal diffraction reflection element, wherein $0 \leq \alpha \leq \xi$ is satisfied,
$\alpha$ represents a rearward angle formed by a main ray of the display light traveling frontward between the additional diffraction reflection element and the incident-angle definition reflection element with respect to the surface of the horizontal diffraction reflection element in a cross section including an up-down direction and a front-rear direction, and
$\xi$ represents a rearward angle formed by a tangent plane of the dustproof cover at a center point of the dustproof cover with respect to the surface of the horizontal diffraction reflection element in the cross section.

4. The virtual image display device according to claim 2, wherein
$Lm > 2 \cdot Ls$ is satisfied,
Ls represents a distance between the display unit and the additional diffraction reflection element, and
Lm represents a distance between the additional diffraction reflection element and the incident-angle definition reflection element.

5. The virtual image display device according to claim 2, wherein
the additional diffraction reflection element causes a wavelength dispersion in a direction opposite to a wavelength dispersion caused by a difference between the angle of incidence and the angle of emission of the horizontal diffraction reflection element.

6. A virtual image display device for a vehicle so as to display a virtual image by projecting a display light of an image toward a projection unit, the virtual image display device comprising:
a display unit configured to emit the display light;
a horizontal diffraction reflection element configured to reflect the display light emitted from the display unit by diffraction, the horizontal diffraction reflection element having at least one flat surface shape along a horizontal plane of the vehicle; and
an additional diffraction reflection element, wherein
the additional diffraction reflection element is provided separately from the horizontal diffraction reflection element,
the horizontal diffraction reflection element is configured to emit the display light toward the projection unit arranged above the horizontal diffraction reflection element when the display light is incident,
an angle of incidence on the horizontal diffraction reflection element is larger than an angle of emission from the horizontal diffraction reflection element
the additional diffraction reflection element reflects the display light by diffraction,
the additional diffraction reflection element is arranged between the display unit and the horizontal diffraction reflection element on an optical path, and
the additional diffraction reflection element causes a wavelength dispersion in a direction opposite to a wavelength dispersion caused by a difference between the angle of incidence and the angle of emission of the horizontal diffraction reflection element.

7. The virtual image display device according to claim 5, wherein
an absolute value of a difference between an angle of incidence on the additional diffraction reflection element and an angle of emission from the additional diffraction reflection element is larger than an absolute value of a difference between the angle of incidence on the horizontal diffraction reflection element and the angle of emission from the horizontal diffraction reflection element.

8. The virtual image display device according to claim 1, wherein
the display unit emits the display light toward the incident-angle definition reflection element so as to form an intersecting optical path extended parallel to a surface of the horizontal diffraction reflection element at an upper side of the surface of the horizontal diffraction reflection element, and
the intersecting optical path intersects an overlapping region where an incident optical path and an emission optical path of the display light emitted from the horizontal diffraction reflection element overlap with each other.

9. The virtual image display device according to claim 1, wherein

Db/2 • cos θo<(L1+L2)• sin(θi−θo)−Sv/2 • cos(θi−θo) is satisfied,

Db represents a size of the horizontal diffraction reflection element,

Sv represents a size of a screen of the display unit,

L1 represents a distance between the screen of the display unit and the incident-angle definition reflection element, L2 represents a distance between the incident-angle definition reflection element and the horizontal diffraction reflection element, θi represents the angle of incidence on the horizontal diffraction reflection element, and θo represents the angle of emission from the horizontal diffraction reflection element.

10. The virtual image display device according to claim 1, wherein (Db• cos θi−Sv)/(2•(L1+L2)−Db• sin θi)>tan(π/2−(θi+2•θm)) is satisfied, Db represents a size of the horizontal diffraction reflection element, Sv represents a size of a screen of the display unit, L1 represents a distance between the screen of the display and the incident-angle definition reflection element, L2 represents a distance between the incident-angle definition reflection element and the horizontal diffraction reflection element, θi represents the angle of incidence on the horizontal diffraction reflection element, θo represents the angle of emission from the horizontal diffraction reflection element, and θm represents a reflection angle of the display light specularly reflected by the incident-angle definition reflection element.

* * * * *